US009520145B2

(12) United States Patent
Stiarwalt

(10) Patent No.: US 9,520,145 B2
(45) Date of Patent: *Dec. 13, 2016

(54) MAGNETIC TAPE REWIND OVERWRITE DATA PROTECTION

(71) Applicant: International Business Machines Corporation, Armonk, NY (US)

(72) Inventor: Randolph E. Stiarwalt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,843

(22) Filed: Aug. 28, 2015

(65) Prior Publication Data

US 2016/0093317 A1    Mar. 31, 2016

Related U.S. Application Data

(63) Continuation of application No. 14/497,223, filed on Sep. 25, 2014, now Pat. No. 9,153,246.

(51) Int. Cl.
*G11B 5/00* (2006.01)
*G11B 5/008* (2006.01)
(Continued)

(52) U.S. Cl.
CPC ............. *G11B 5/00813* (2013.01); *G11B 5/09* (2013.01); *G11B 15/6885* (2013.01);
(Continued)

(58) Field of Classification Search
CPC .... G06F 12/0246; G06F 12/00; G11B 15/087;
G11B 5/00817; G11B 5/00813; G11B 19/04; G11B 27/032; G11B 5/4893; G11B 2220/90; G11B 5/09; G11B 27/002; G11B 2220/41
(Continued)

(56) References Cited

U.S. PATENT DOCUMENTS 6,253,294 B1  6/2001  Dahman et al.
6,356,803 B1  3/2002  Goodman et al.
(Continued)

FOREIGN PATENT DOCUMENTS

EP    001394798 A1    3/2004
EP    002328144 A1    6/2011
(Continued)

OTHER PUBLICATIONS

Apvrille et al., "A Time Stamped Virtual WORM System," SEcurite des Communications sur Internet—SECI02, Sep. 2002, pp. 93-104.
(Continued)

*Primary Examiner* — Ali Neyzari
(74) *Attorney, Agent, or Firm* — Zilka-Kotab, PC

(57) ABSTRACT

A computer-implemented method for preventing overwriting of data, e.g., on a magnetic medium, includes receiving a write command to write to a magnetic tape. The current location of the magnetic tape is determined. A determination is also made as to whether data corresponding to the write command is at least one of: a size and type specified for a block at the current location. Execution of the write command is disallowed in response to determining that the data corresponding to the write command is not of the specified size and/or type.

20 Claims, 11 Drawing Sheets

(51) Int. Cl.
*G11B 19/04* (2006.01)
*G11B 27/032* (2006.01)
*G11B 15/68* (2006.01)
*G11B 5/09* (2006.01)
*G11B 27/00* (2006.01)
*G11B 5/48* (2006.01)

(52) U.S. Cl.
CPC ............ *G11B 19/04* (2013.01); *G11B 27/002* (2013.01); *G11B 27/032* (2013.01); *G11B 5/4893* (2013.01); *G11B 2220/41* (2013.01); *G11B 2220/90* (2013.01)

(58) Field of Classification Search
USPC .............................. 360/60, 69, 75, 31, 77.12
See application file for complete search history.

(56) References Cited

U.S. PATENT DOCUMENTS

| | | | |
|---|---|---|---|
| 7,424,206 B2 | 9/2008 | Kouzai et al. | |
| 7,469,314 B2 | 12/2008 | Dahman et al. | |
| 7,843,663 B2 | 11/2010 | Nave et al. | |
| 8,054,572 B2 | 11/2011 | Brume et al. | |
| 8,489,785 B2 | 7/2013 | Itagaki et al. | |
| 8,693,128 B2 | 4/2014 | Masuda et al. | |
| 8,917,473 B2* | 12/2014 | Fujihara | G11B 5/00817 360/72.3 |
| 9,093,107 B2* | 7/2015 | Fujihara | G11B 5/00817 |
| 9,153,246 B1 | 10/2015 | Stiarwalt | |

| | | |
|---|---|---|
| 2003/0107836 A1 | 6/2003 | Zweighaft et al. |
| 2005/0223162 A1 | 10/2005 | Evans et al. |
| 2005/0235103 A1 | 10/2005 | Saliba et al. |
| 2006/0026623 A1 | 2/2006 | Asano |
| 2006/0127065 A1 | 6/2006 | Kouzai et al. |
| 2006/0203373 A1 | 9/2006 | Dahman et al. |
| 2007/0019928 A1 | 1/2007 | Wada |
| 2008/0316634 A1 | 12/2008 | Dahman et al. |
| 2011/0051278 A1 | 3/2011 | Brume et al. |
| 2012/0257301 A1 | 10/2012 | Masuda et al. |

FOREIGN PATENT DOCUMENTS

| | | |
|---|---|---|
| GB | 2266001 A | 10/1993 |
| GB | 2410602 A | 8/2005 |
| WO | 2004091206 A1 | 10/2004 |

OTHER PUBLICATIONS

Hsu et al., "Content Immutable Storage: Truly Trustworthy and Cost-Effective Storage for Electronic Records," RJ10332 Computer Science, Oct. 18, 2004, pp. 1-5.
Sion, R., "Strong WORM," The 28th International Conference on Distributed Computing Systems, Jun. 17-20, 2008, pp. 69-76.
Non-Final Office Action from U.S. Appl. No. 14/497,223, dated Feb. 18, 2015.
Notice of Allowance from U.S. Appl. No. 14/497,223, dated Jun. 4, 2015.
Stiarwalt, R.E., U.S. Appl. No. 14/497,223, filed Sep. 25, 2014.
List of IBM Patents or Patent Applications Treated as Related.

* cited by examiner

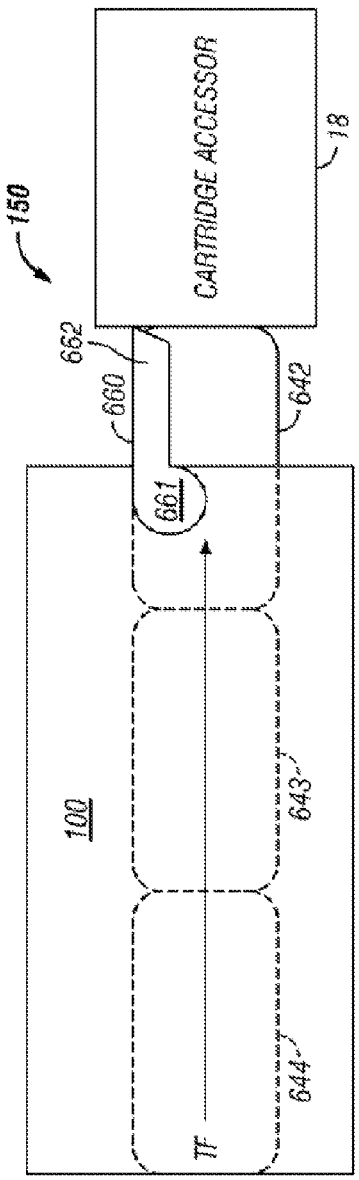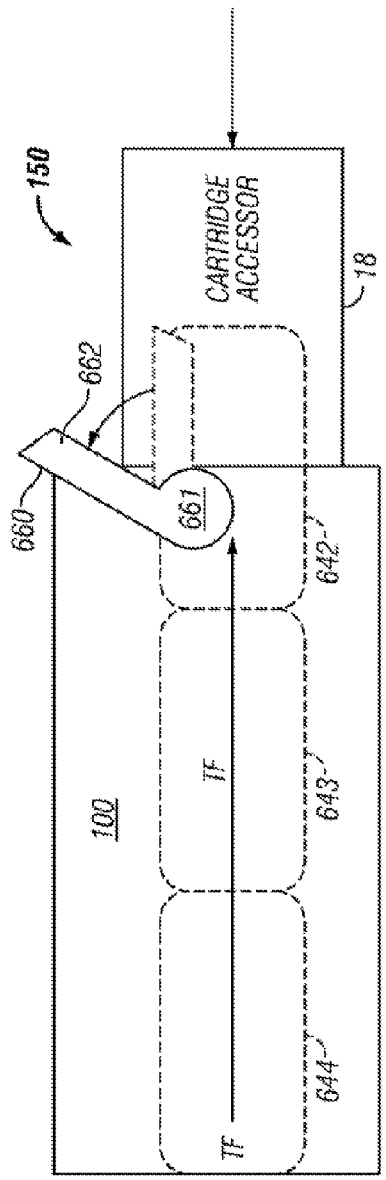
FIG. 8A
FIG. 8B

MAGNETIC TAPE REWIND OVERWRITE DATA PROTECTION

BACKGROUND

The present invention relates to data storage systems, and more particularly, this invention relates to preventing overwriting of data on tape by determining a location on tape prior to performing a write operation.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

In addition to data storage media, automated data storage libraries typically comprise data storage drives that store data to, and/or retrieve data from, the data storage cartridge media. Further, automated data storage libraries typically comprise I/O stations at which data storage cartridges are supplied, added to, or removed from, the library. However, conventional products have been unable to protect data written to data storage cartridges from being overwritten as a result of rewind operations.

BRIEF SUMMARY

A method according to one embodiment includes receiving a write command to write to a magnetic tape. The current location of the magnetic tape is determined. A determination is also made as to whether data corresponding to the write command is at least one of: a size and type specified for a block at the current location. Execution of the write command is disallowed in response to determining that the data corresponding to the write command is not of the specified size and/or type.

A system according to one embodiment includes a processor and logic integrated with and/or executable by the processor. The logic is configured to cause the foregoing method to occur.

A computer program product according to one embodiment includes a computer readable storage medium having program instructions embodied therewith, the program instructions readable and/or executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. For example, various embodiments disclosed herein are able to prevent overwriting of data in a tape environment. For example, upon receiving a write command, various tape drives described below may only allow the tape drive to write at the beginning of tape if it is in the typical size and/or type for a tape label, e.g., to prevent any unwanted overwrite of data resulting from a tape rewind.

In one general embodiment, a method includes receiving a write command to write to a magnetic tape. A determination is made as to whether a current location of the magnetic tape is at a block at a beginning of tape. A determination is also made as to whether data corresponding to the write command is at least one of: a size and type specified for the block. Execution of the write command is disallowed when the data corresponding to the write command is not of the specified size and/or type.

In another general embodiment, a system includes a processor and logic integrated with and/or executable by the processor. The logic is configured to cause the foregoing method to occur.

In yet another general embodiment, a computer program product includes a computer readable storage medium having program instructions embodied therewith, the program instructions readable and/or executable by a controller to cause the controller to perform the foregoing method.

Various embodiments may be implemented in a stand-alone system, such as in a tape drive that is coupleable to a host. In other approaches, the system may be implemented in a larger system, such as in an automated data storage library or a virtual tape drive.

Figure 1:
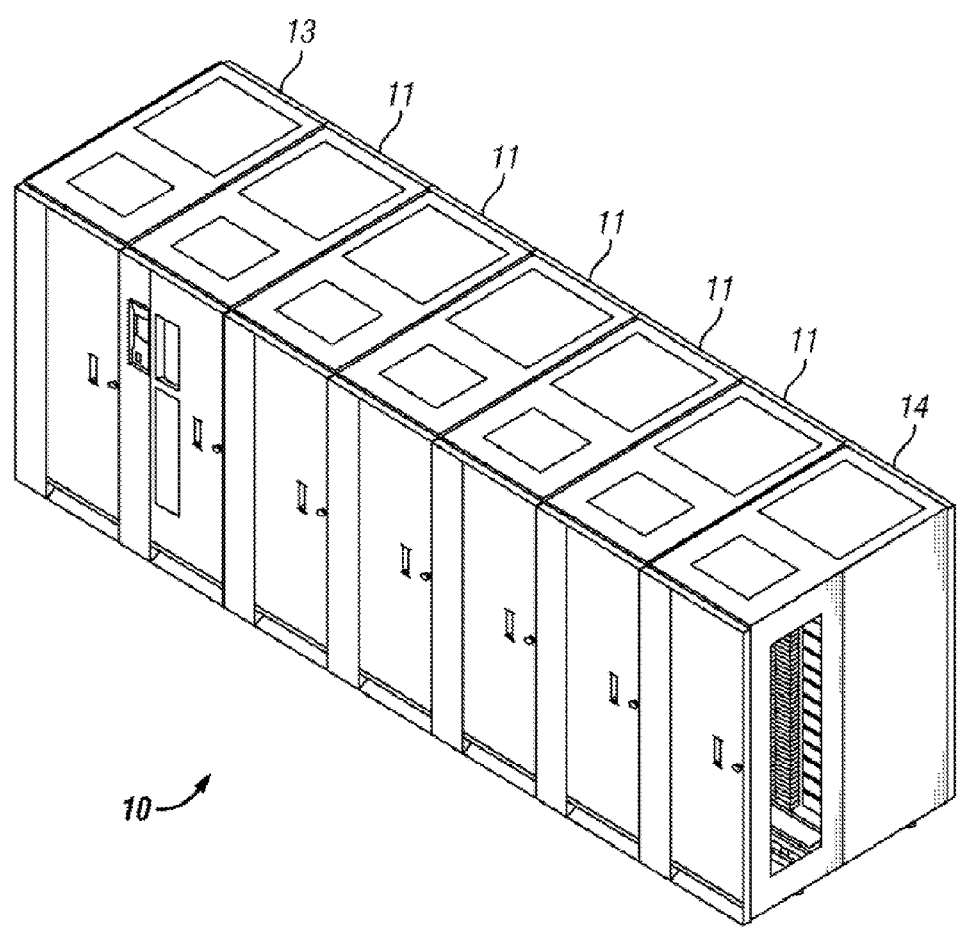
FIG. 1 is a perspective view of an automated data storage library according to one embodiment.
Figure 2:
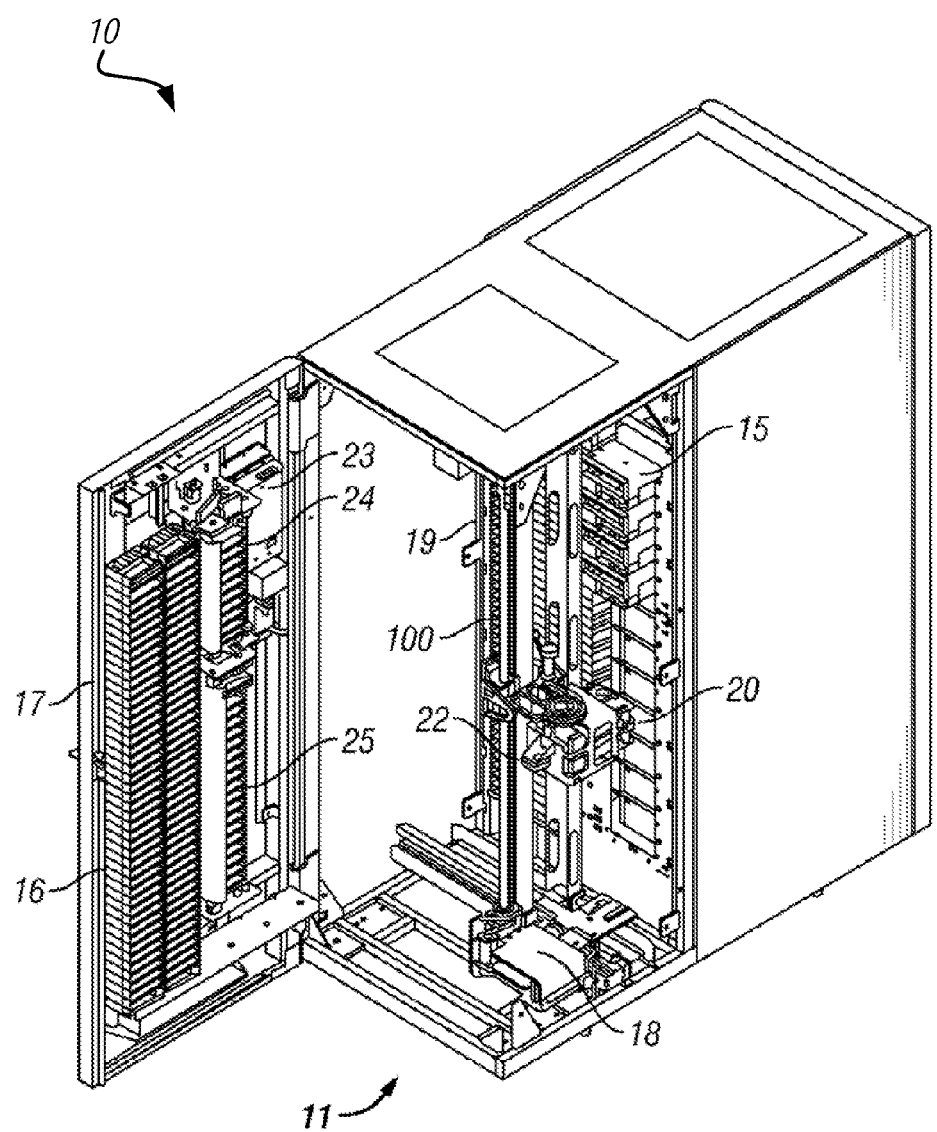
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
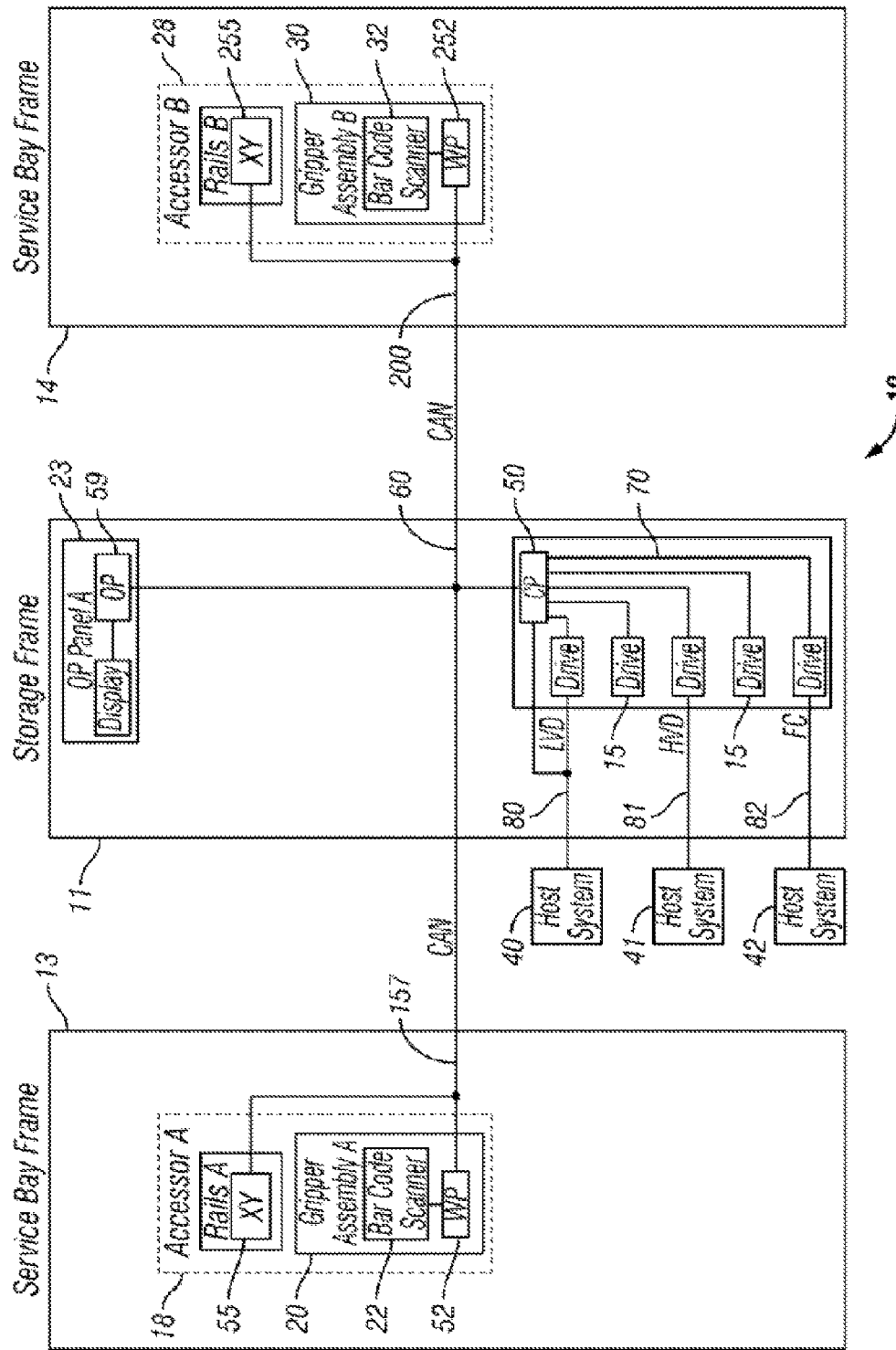
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes as will be discussed in further detail below.

According to an exemplary embodiment, an automated data storage library which may implement the distributed system depicted in the block diagram of FIG. 3, and/or other approaches presented herein, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," and is hereby incorporated by reference.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed, as that term is defined in U.S. Pat. No. 6,356,803.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be SCSI busses. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by means of lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. Essentially, the term "library controller" as used herein is intended in its broadest sense as a device that contains at least one computer processor, as such term is defined herein.

Figure 4:
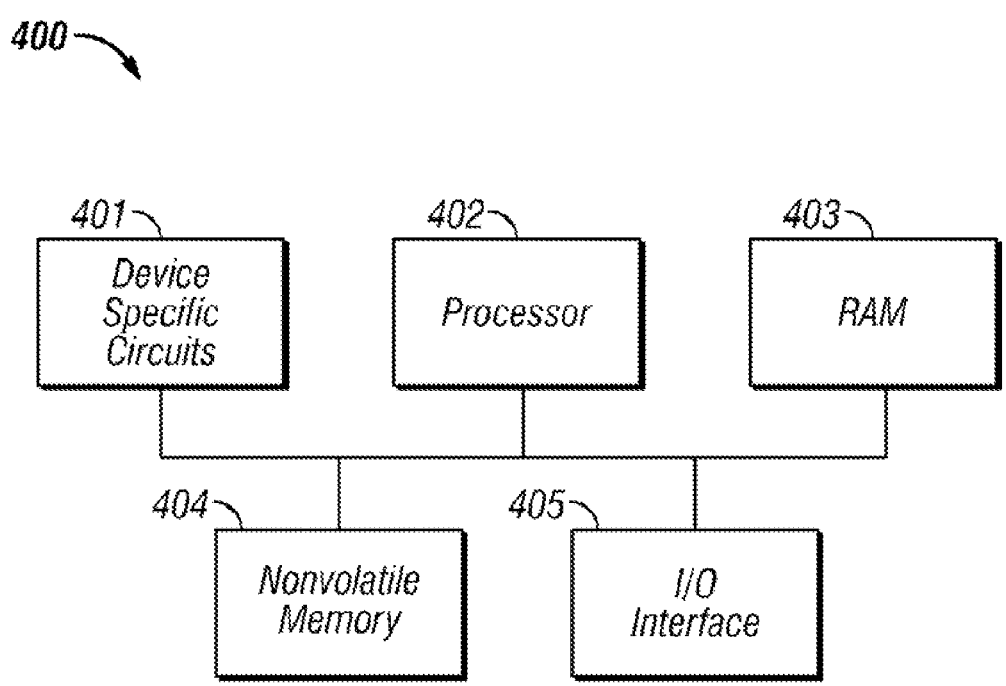
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
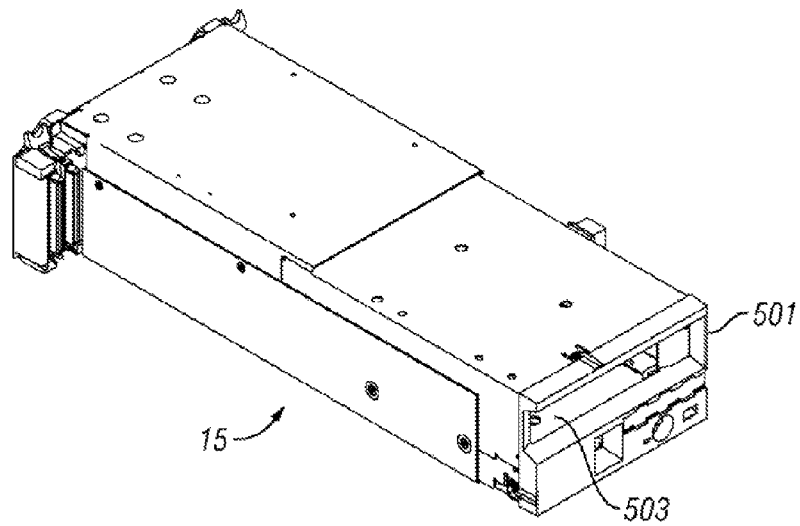
FIG. 5A is a frontal perspective view of a data storage drive according to one embodiment.
Figure 5B:
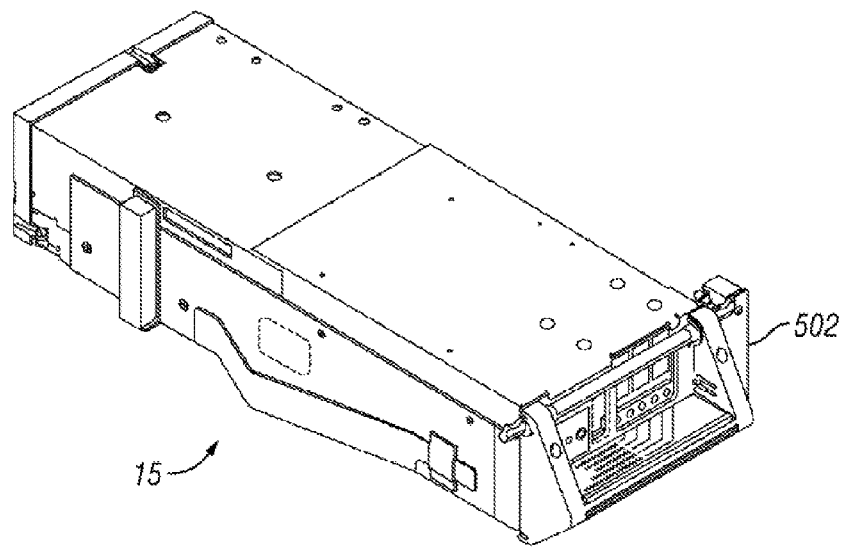
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
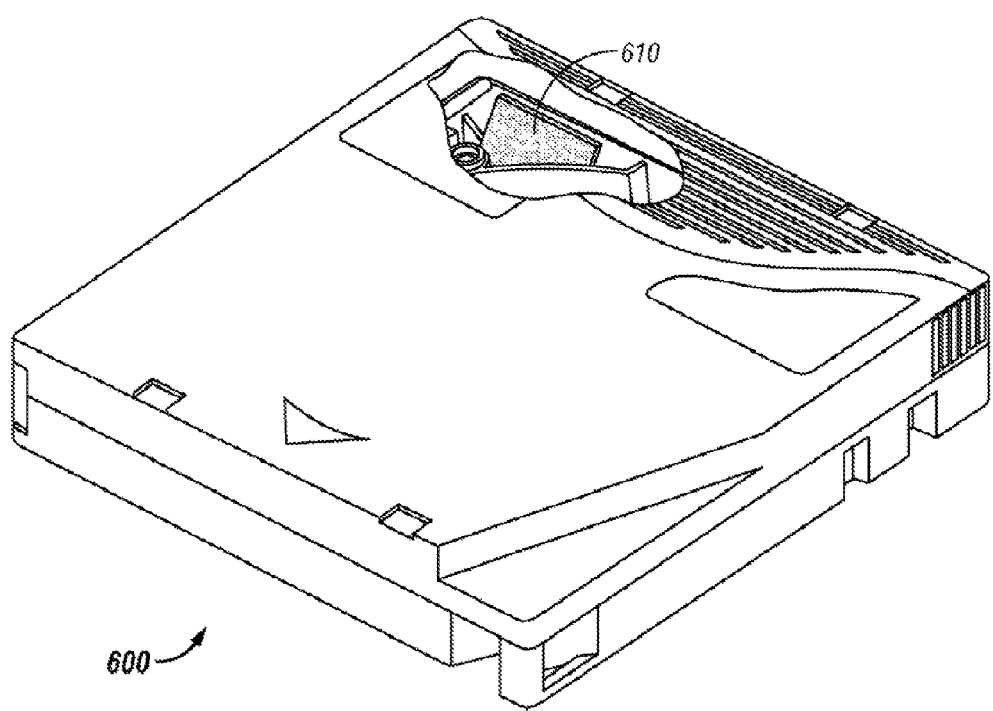
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
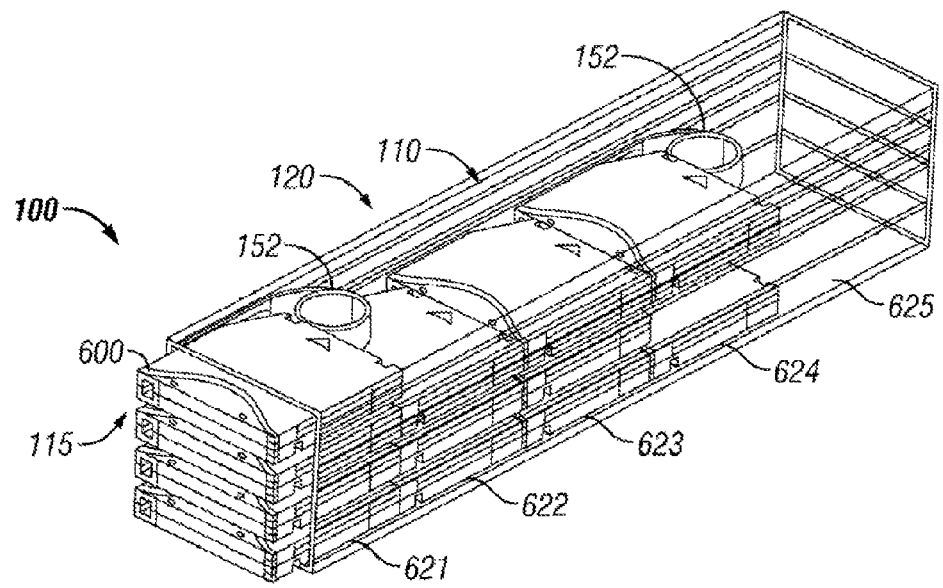
FIGS. 7A-7B are perspective views of a multi-cartridge deep slot cell according to one embodiment.
Figure 7B:
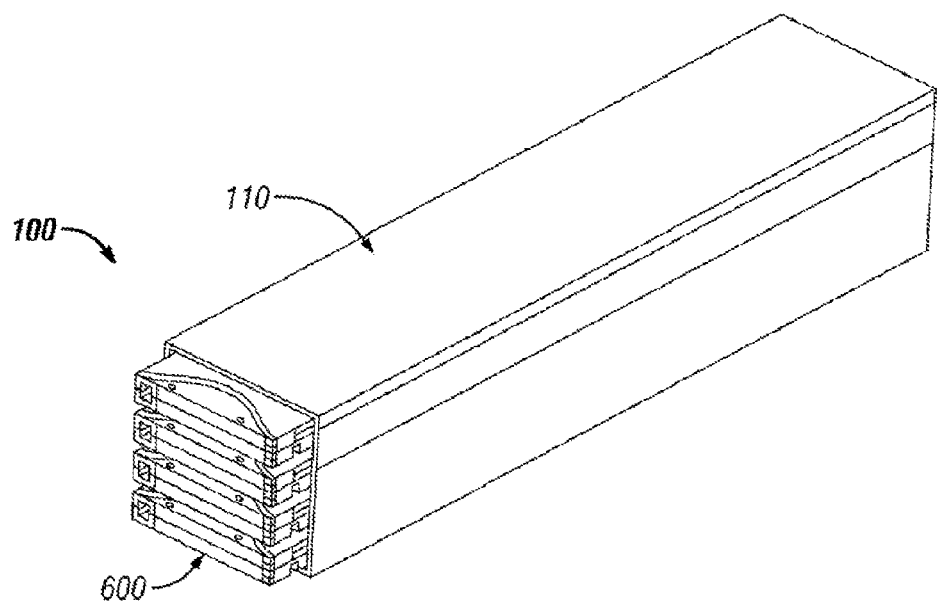

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8C:
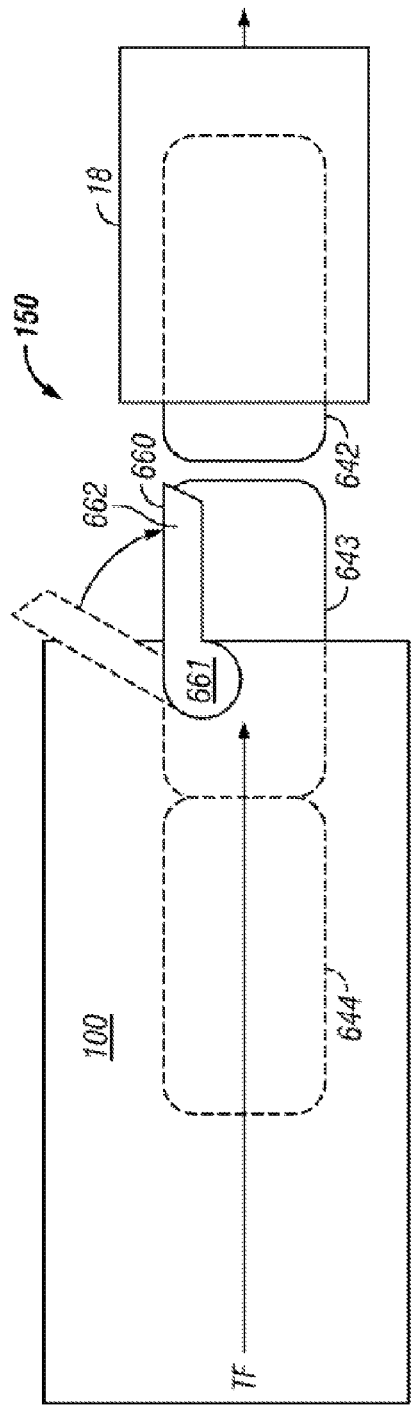

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
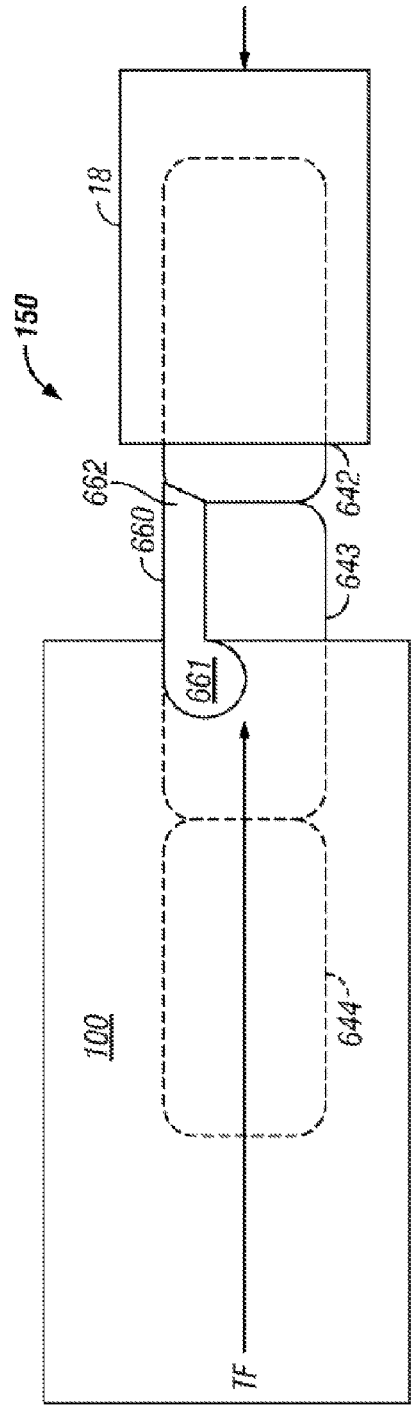

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

For a fuller understanding of the retaining gate, refer to U.S. patent application Ser. No. 11/674,904, which is entitled "Retaining Gate for Deep Storage Slot Retention of Storage Cartridges", which is incorporated herein for reference.

Thus, looking to the embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Moreover, explanation of method 750 is done with continued reference to the storage frame 11 of FIG. 2.

Figure 9:
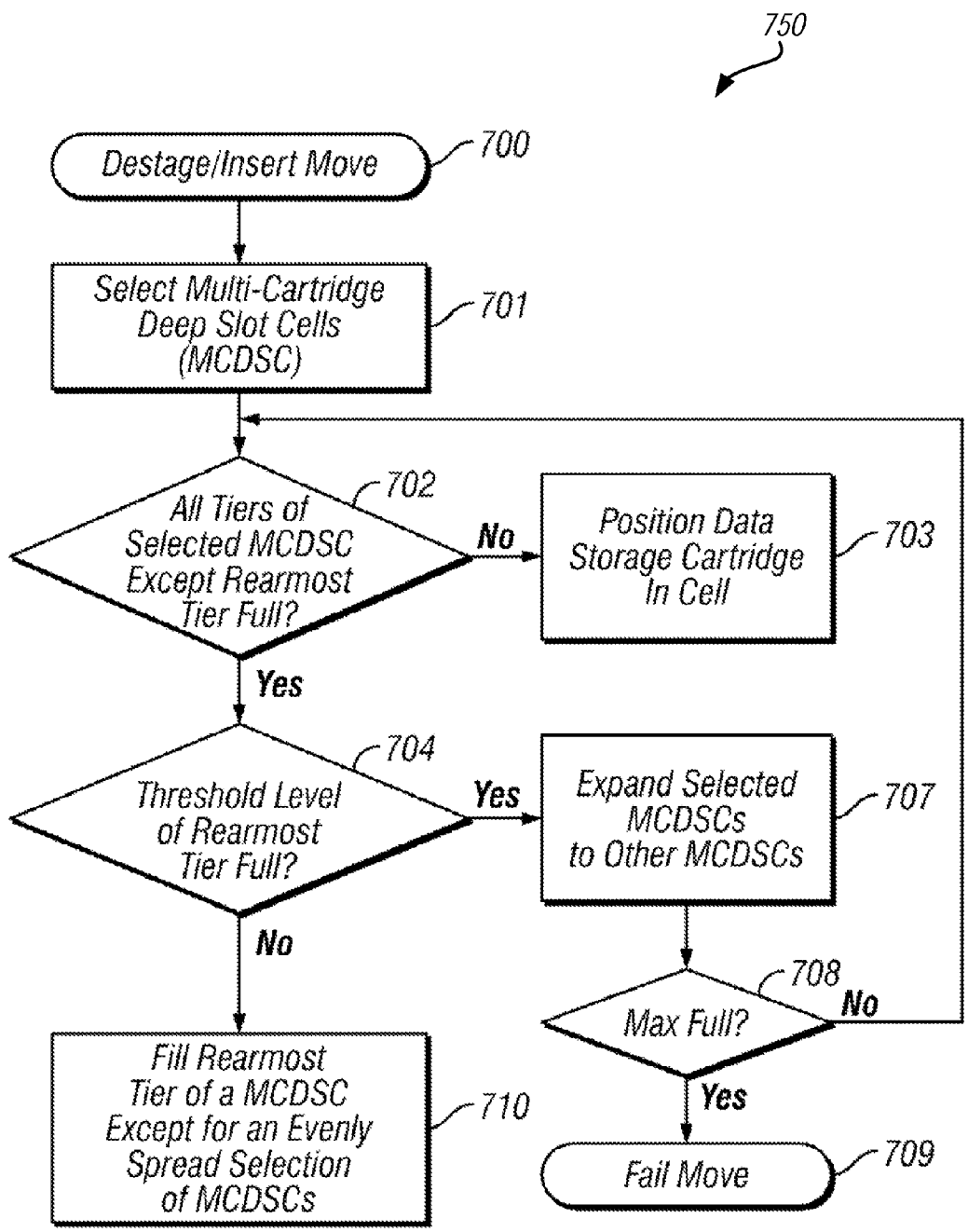
FIG. 9 is a flowchart for a method according to one embodiment.

Referring now to FIG. 9, method 750 illustrates an embodiment of a method of storing data storage cartridges by an automated data storage library. The method 750 may be used to selectively extract, place and transport data storage cartridges with respect to multi-cartridge deep slot cells, where cartridges are placed in tier 1 (the frontmost tier) of a multi-cartridge deep slot cell, moving or demoting any other cartridges in the multi-cartridge deep slot cell by one tier.

The method 750 includes performing destage and/or insert moves. See step 700. According to a preferred approach, insert moves comprise adding new cartridges to the library. Moreover, according to other approaches, destage moves may result from demount moves, e.g., demounting cartridges from data storage drive(s) 15. In method 750, the library controller operates the accessor(s) to selectively extract a specific cartridge from one location, and transport the data storage cartridge with respect to other elements of the automated data storage library.

When the operation(s) at the data storage drive are complete, the controller operates the accessor(s) to return the cartridge to a storage slot 16 or to a multi-cartridge deep slot cell 100. However, if all of the single cartridge storage slots 16 are full, at least in the particular frame of the library of the data storage drive 15 from which the data storage cartridge was previously demounted, the controller may swap the data storage cartridge with a data storage cartridge in another storage slot. Furthermore, the swapped data storage cartridge may then be demoted to tier 1 of a multi-cartridge deep slot cell 100, in an action called "destage", and the demounted cartridge is moved to the storage slot vacated by the demoted cartridge.

As an example, which is in no way intended to limit the invention, all of the single cartridge storage slots may be full because the cartridges mounted in the data storage drives are all from the multi-cartridge deep slot cells. Moreover, according to another approach, the movement of the data storage cartridges may be conducted while maintaining the rearmost tier of the multi-cartridge deep slot cells vacant, called "depth spreading".

Referring again to FIG. 9, step 701 comprises selecting the multi-cartridge deep slot cells (MCDSC) from which to make the choice of loading for a destage or insert move, depending on step 700. One choice may include a single column of multi-cartridge deep slot cells closest to the source of the move, which may limit the potential lateral movement of the accessor. However, an expanded choice may be a section of the library encompassing more than one column. Another choice may be a frame of the library, while a last choice may be the entire library.

In a preferred approach, the library controller maintains an inventory of cartridges and cells, and completes the selection of a multi-cartridge deep slot cell to place the added or inserted cartridge before movement of the accessor.

According to different approaches, at least one, some, a majority, all, etc. of the multi-cartridge deep slot cells in the chosen set may be "selected", while the remainder may be reserved. One example comprises reserving a multi-cartridge deep slot cell to temporarily deposit or store data storage cartridges extracted from the front tiers of another multi-cartridge deep slot cell in order to access and extract a cartridge towards or at the rear of that other multi-cartridge deep slot cell.

With continued reference to FIG. 9, in step 702, the library controller determines whether one or more tiers in addition to the rearmost tier (e.g., 265 of FIG. 7A) is available in any of the selected multi-cartridge deep slot cells, or whether all tiers except the rearmost tier are full.

If at least one tier other than the rearmost tier is available, "NO", in step 703, the library controller operates the accessor(s) to place the next cartridge in one of the selected multi-cartridge deep slot cells, until the stage is reached where each of the frontmost tiers of the selected multi-cartridge deep slot cells become full. According to one approach, the library controller may operate the accessor(s) to place data storage cartridges in the multi-cartridge deep slot cells while maintaining the rearmost tier of the cells vacant. Thus, each of the multi-cartridge deep slot cells may be full except for the rearmost tier of each of the cells.

Referring back to step 702 of FIG. 9, if all of the tiers except the rearmost tier are full, "YES", step 704 determines whether a threshold level of the selected multi-cartridge deep slot cells are full, including the rearmost tier. According to one approach, the threshold may be considered as a determination whether a minimum level of the number of available positions in the rearmost tier of the selected cells has been reached. Moreover, some positions are left available to temporarily deposit or store data storage cartridges extracted from the front tiers of another multi-cartridge deep slot cell in order to access and extract a cartridge towards or at the rear of that other multi-cartridge deep slot cell.

The threshold level may, for example, be that ⅞ of the rearmost tiers of the selected set of multi-cartridge deep slot cells are full and that ⅛ are vacant. In another approach, the threshold may be a specific number of vacancies. The threshold level, in one embodiment, may be predetermined as based on the likely number of cartridges that will be temporarily deposited while accessing a cartridge located in a rearmost tier.

Looking again to step 704, if the threshold level of the selected set of multi-cartridge deep slot cells has been reached, "YES", in step 707, the selection of multi-cartridge deep slot cells is expanded. For example, if the initial selection is a specific column of cells, the selection may be expanded to a number of adjacent columns of cells, to the cells in an entire frame, to the cells of the entire library, etc. Furthermore, if step 708 indicates that the threshold level has been reached for the maximum selection of cells, the destage or insert move is failed in step 709. Otherwise, the process returns to step 702 where the expanded set of multi-cartridge deep slot cells are checked again.

According to one approach, if the library controller has determined that all tiers of the selected multi-cartridge deep slot cells except the rearmost tier are full, e.g., in step 702, another data storage cartridge may be added to the library 10. Moreover, the added data storage cartridge may be demoted to tier 1 in the operations of selectively extracting, placing and transporting data storage cartridges, but is not limited thereto.

With continued reference to the method 750 of FIG. 9, when all tiers except the rearmost tiers are full, and the threshold level of step 704 has not been reached, "NO", in step 710, destaged or inserted data storage cartridges are placed in selected multi-cartridge deep slot cells in tier 1 so as to demote the other cartridges in the cell. As a result, the rearmost tier of the multi-cartridge deep slot cells are filled, except for an evenly spread selection of the multi-cartridge deep slot cells. In one approach, the evenly spread selection may include filling the rearmost tier of multi-cartridge deep slot cells having vacant rearmost tiers based on a random selection. Moreover, as the rearmost tier of one of the multi-cartridge deep slot cells is filled, that cell is removed from the random selection.

However, according to another approach, in response to the determination that all tiers of the selected multi-cartridge deep slot cells 100 except the rearmost tier are full, the library controller may operate the accessor(s) to place data storage cartridges to fill the selected multi-cartridge deep slot cells except for the rearmost tier of every Nth selected multi-cartridge deep slot cell. As one example, "N" may comprise a binary number beginning with "2", or every second cell. The selection of every second cell may begin at any arbitrary cell of the library, and may comprise selecting cells to fill or cells to maintain the rearmost tier vacant.

According to another embodiment, the library controller may employ tie breakers as needed to place the added data storage cartridges in the frontmost tier of the multi-cartridge deep slot cell 100 having the every second, fourth, etc. cell that has the rearmost tier available. According to different approaches, the tie breaker may select the specific cell based on its having the least recently used data storage cartridge in the frontmost tier and/or is at the closest proximity to the source of the move, but is not limited thereto.

Thus, according to one approach, the method 750 of FIG. 9 may continue in binary fashion, filling and leaving vacant the rearmost tier every eighth multi-cartridge deep slot cell 100, etc., and may ultimately fill the rearmost tier of all multi-cartridge deep slot cells, or reach the defined threshold of multi-cartridge deep slot cells set by the library controller.

The "depth spreading" discussed above provides an evenly spread availability of at least the rearmost tier of a number of multi-cartridge deep slot cells, for example, through random selection, or by leaving the rearmost tier of every Nth one of the multi-cartridge deep slot cells vacant. This vacant tier of a number of multi-cartridge deep slot cells, in one embodiment, provides vacant tiers in which to temporarily store or deposit the overlying data storage cartridges to gain access to the target data storage cartridge. Also, or alternatively, certain of the multi-cartridge deep slot cells or certain tiers may be reserved for the purpose of temporarily depositing data storage cartridges overlying a target cartridge.

As described above, a controller may facilitate extracting a cartridge from a multi-cartridge deep slot cell, transport the cartridge to a data storage drive and placing the cartridge in the drive, e.g., see 15 of FIG. 2. Once in the data storage drive, data may be read from and/or written to tape stored in the cartridge.

However, conventional products have been plagued with data loss resulting from unintentional overwrites of data stored on tape in cartridges. Specifically, problems have occurred when a first host (Host A) writes to a drive and a second host (Host B) issues a rewind request to the same drive. The drive performs the rewind as instructed by Host B, after which Host A continues writing. Host A is not aware that the tape location has changed as a result of the drive performing the rewind request, and as a result, the continued writing overwrites previously written tracks beginning at the location the tape has been rewound to. Moreover, data that is overwritten is usually unrecoverable, and in some instances may compromise the entirety of the data stored on the remainder of the tape. For example, if a conventional product overwrites 25 data blocks on a 4 Terabyte (TB) tape, the entire 4 TB of data may be lost.

Attempts to overcome this issue have been implemented in IO drivers, software, tape management system software, etc. of conventional products, but have proven to be unsuccessful. In sharp contrast, various embodiments herein are desirably able to protect data stored on magnetic tape from being overwritten as a result of intermittent rewind commands being performed while writing to the tape. Specifically, by determining a current location of tape relative to a set of transducers, it may be determined if a pending write operation will be performed in a desired location on the tape, as will be described in further detail below.

Tape drives and code embodied therewith are able to determine what the data corresponding to pending write requests includes when the requests are received. As a result, tape drives and code embodied therewith may be able to determine if a write command has been issued, and if so, whether the drive is located at a block at which it is appropriate to perform the write request. For example, if the tape drive is located at a block at the beginning of tape, the data to be written desirably matches the size and type specified for the block at the beginning of the tape.

Figure 10:
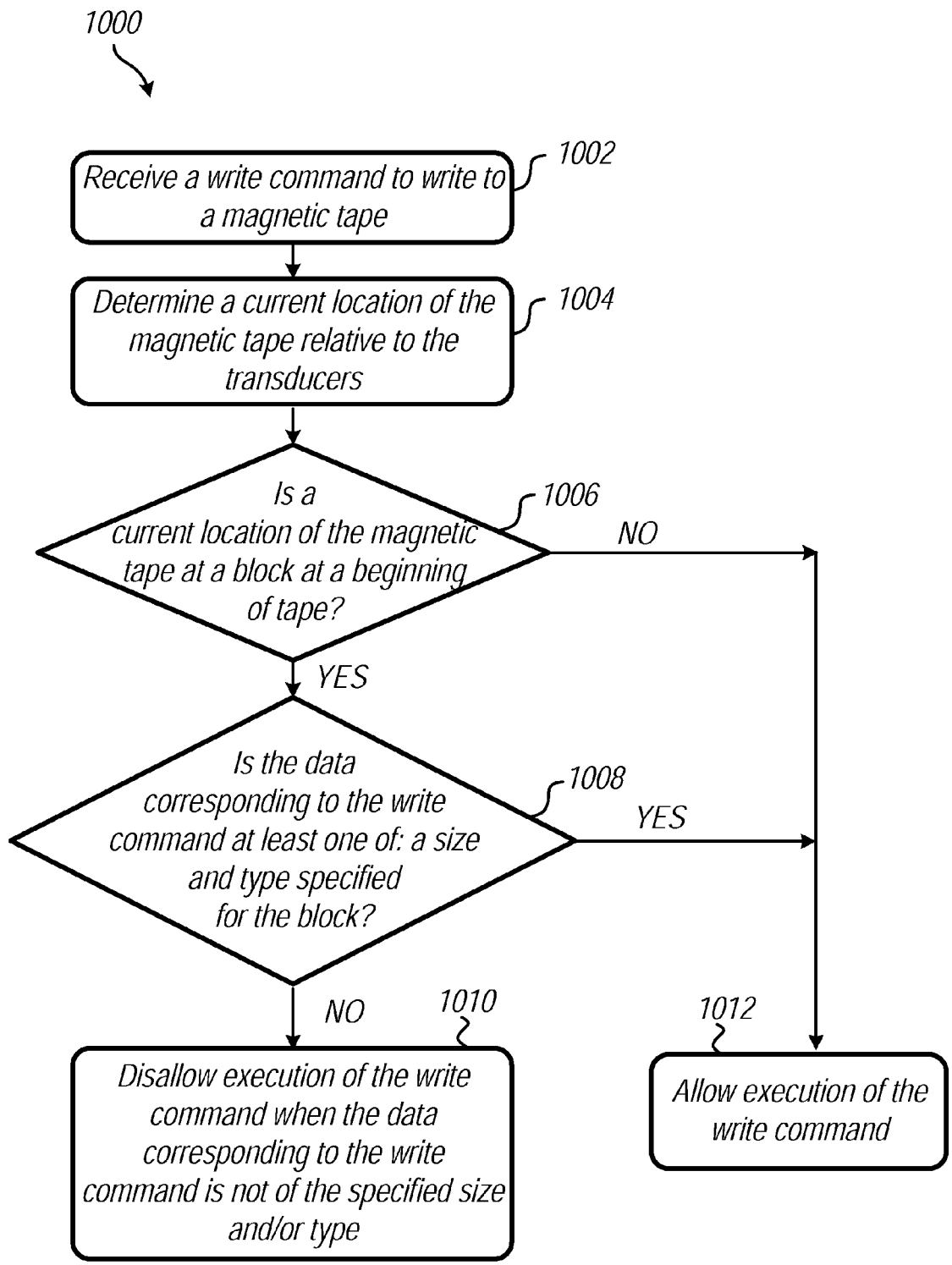
FIG. 10 is a flowchart for a method according to one embodiment.

Referring now to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a driver, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

Further still, any one or more of the operations of method 1000 may be implemented in one or more tape drives using microcode embodied therewith. In some approaches, one or more of the operations of method 1000 may be implemented in a system having a processor and logic integrated with and/or executable by the processor, the logic being configured to perform the one or more operations of method 1000. It follows that any of the approaches described herein may be applied to physical and/or logical tape systems depending on the desired embodiment.

Referring now to FIG. 10, method 1000 begins with operation 1002 which includes receiving a write command to write to a magnetic tape. The write command may come from a host, computer, etc. and may include data to be written to the tape.

Operation 1004 includes determining a current location of the magnetic tape relative to transducers intended to perform the write command. It follows that, referring to the present description, the "current location" may be the location where the writing requested by the write command will be performed if allowed. The current location may be determined in any conventional manner, such as by reading Linear Position (LPOS) data from the servo tracks of the tape, determining a block identifier of the last written data block and/or of the data block to be written, etc.

Method 1000 further includes determining whether the current location of the magnetic tape is at a block at a beginning of tape, as seen in operation 1006.

If operation 1006 determines that the current location is not at a block at the beginning of tape, method 1000 proceeds to operation 1012 which allows execution of the write command.

However, if it is determined that the current location is at a block at the beginning of tape, method 1000 proceeds to operation 1008 which includes determining whether the data corresponding to the write command is at least one of: a size and type specified for the block. According to some approaches, the type of the data may correspond to a volume identifier (VOLID) as will soon become apparent.

The first three takes of each partition in standard volume magnetic recording tapes typically include three 80 byte character blocks of data, each of which are represented by a block identifier (Block ID). The first 80 byte character block of data Block ID-0 includes a VOLID which is used to identify the cartridge and tape stored therein. Moreover, following Block ID-0 are Block ID-1 and Block ID-2, each of which contain a header.

The VOLID for a given tape usually includes, but is not limited to, a six character name which may be encoded on the tape (e.g., for the tape drive to read) as well as the outside of the tape cartridge (e.g., for humans to read). Thus, when a read request is being processed, the drive is able to ensure that the cartridge mounted in the drive is the one that was actually requested by reading the VOLID. If the tape management software verifies that the VOLID read from the tape corresponds to what was actually requested, the drive may be permitted to run any desired program.

Following the three 80 byte character blocks of data at the beginning of tape, data is written in much larger blocks. For example, which is in no way intended to limit the invention, depending on the embodiment, data may be written to a magnetic tape in 16k, 32k, 64k, 128k, etc. blocks. In other words, data written to tape following the initial three blocks of data are not written in character blocks of a byte size corresponding to current and/or previous standard volume label rules. Thus, the size specified for a block at the beginning of tape may be different than a size specified for a user data block located after any initial predefined and/or preassigned blocks of data. Furthermore, according to various approaches, any VOLID and/or block size specified by the label rules for the format of the data written to the tape may be imposed depending on the desired embodiment.

Referring still to method 1000 of FIG. 10, if it is determined that the data corresponding to the write command is not of the specified size and/or type specified for the block, operation 1010 includes disallowing execution of the write command received in operation 1002. Thus, according to some approaches, execution of the write command may be disallowed if data corresponding to the write command is either not of the specified size or not of the specified type, while according to other approaches, execution of the write command may be disallowed if data corresponding to the write command is not of the specified size and type. Examples of further operations in response to disallowing execution of the write command are presented below.

Alternatively, if it is determined in operation 1008 that the data corresponding to the write command is of the specified size and/or type specified for the block, method 1000 proceeds to operation 1012 which allows execution of the write command.

Following the examples provided above, method 1000 may be implemented in an embodiment in which requests corresponding to a given tape are received from two different hosts: Host A and Host B. According to one such approach, which is in no way intended to limit the invention, the write command received in operation 1002 may be received from Host A. However, the current location of the magnetic tape may be at a block at the beginning of the tape, e.g., due to a rewind command received from Host B and implemented by the tape drive between write operations of the write command. As a result, data corresponding to the write command from Host A would not correspond to a specified size and/or type specified for the block at the current location, and the write operation would be rejected.

It follows that various embodiments described herein preferably include drive microcode which includes a selectable operation mode which is able to determine when a current location is at the beginning of a tape. Moreover, the microcode is preferably able to disallow any write commands received that do not match the type and/or size of write commands corresponding to the first three blocks of the current partition of tape, e.g., in order to protect data previously written to the tape from being overwritten.

In other words, if the current location corresponds to any of Block ID-0, Block ID-1, or Block ID-2 and a pending write request includes writing anything other than a block of data corresponding to the size and/or type of that corresponding to Block ID-0, Block ID-1, and Block ID-2, the write operation will fail. Thus, if the block corresponding to the current location of the magnetic tape is a first block on the present partition of the tape, user write requests are preferably denied as the data corresponding to the requests will not correspond to a size or type specified for the first block. According to an exemplary in-use embodiment which is in no way intended to limit the invention, only 80 byte character records may be written to Block ID-0, block ID-1, and block ID-2.

Upon rejecting a write operation, e.g., for reasons described herein and those similar thereto, a tape drive may inform a host of the rejection. According to some approaches, a notification may be sent to the host from which the write operation was received. However, in other approaches, a notification may be sent to an administrator, a system manager, stored in memory (e.g., a lookup table), etc.

The notification may be in the form of a unit check sent from the tape drive where the rejection occurred. Moreover, in some approaches, the unit check may include a fault system code which includes a system message that indicates the cause of the failure. However, in order to present meaningful information to a host, e.g., such as a fault system code, additional software changes may be implemented in the drive.

After a failure has been detected, the corresponding tape drive may remain at the location on the tape where the failure was detected until any further instructions are received. For example, host recovery efforts and/or system software may determine any post-failure operations for the tape drive to perform. However, in other approaches, the cartridge containing the tape on which the failure occurred may simply be removed from the tape drive. It should also be noted that any of the approaches described herein may be applied to physical and/or logical tape systems depending on the desired embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

Moreover, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be further appreciated that embodiments of the present invention may be provided in the form of a service deployed on behalf of a customer. Those of skill in the art will understand that changes may be made with respect to the methods discussed above, including changes to the ordering of the choices of the methods of FIG. 9. Further, those of skill in the art will understand that differing specific component arrangements may be employed than those illustrated herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   receiving a write command to write to a magnetic tape;
   determining a current location of the magnetic tape;
   determining whether data corresponding to the write command is at least one of:
   a size and type specified for a block at the current location; and
   disallowing execution of the write command in response to determining that the data corresponding to the write command is not of the specified size and/or type.

2. A computer-implemented method as recited in claim 1, wherein the type of the data corresponds to a volume identifier.

3. A computer-implemented method as recited in claim 1, wherein the size specified for the block is different than a size specified for a user data block.

4. A computer-implemented method as recited in claim 1, wherein the block is a first block on the tape.

5. A computer-implemented method as recited in claim 1, wherein execution of the write command is disallowed in response to determining that the data corresponding to the write command is not of the specified size and type.

6. A computer-implemented method as recited in claim 1, wherein the method is performed in a tape drive.

7. A computer-implemented method as recited in claim 6, wherein the write command is received from a first host, wherein the current location of the magnetic tape is at the block at a beginning of tape because of a rewind command received from a second host.

8. A system, comprising:
   a processor and logic integrated with the processor, executable by the processor, or integrated with and executable by the processor, the logic being configured to:
   receive a write command to write to a magnetic tape;
   determine a current location of the magnetic tape;
   determine whether data corresponding to the write command is at least one of: a size and type specified for a block at the current location; and
   disallow execution of the write command in response to determining that the data corresponding to the write command is not of the specified size and/or type.

9. A system as recited in claim 8, wherein the type of the data corresponds to a volume identifier.

10. A system as recited in claim 8, wherein the size specified for the block is different than a size specified for a user data block.

11. A system as recited in claim 8, wherein the block is a first block on the tape.

12. A system as recited in claim 8, wherein execution of the write command is disallowed in response to determining that the data corresponding to the write command is not of the specified size and type.

13. A system as recited in claim 8, comprising a tape drive having or in communication with the processor.

14. A system as recited in claim 13, wherein the write command is received from a first host, wherein the current location of the magnetic tape is at the block at a beginning of tape because of a rewind command received from a second host.

15. A system as recited in claim 8, comprising:
   a drive mechanism for passing a magnetic medium over a magnetic head; and
   a controller electrically coupled to the magnetic head, the processor being part of the controller.

16. A computer program product comprising a computer readable storage medium having program instructions embodied therewith, the program instructions readable and/or executable by a controller to cause the controller to:
   receive, by the controller, a write command to write to a magnetic tape;
   determine, by the controller, a current location of the magnetic tape;
   determine, by the controller, whether data corresponding to the write command is at least one of: a size and type specified for a block at the current location; and
   disallow, by the controller, execution of the write command in response to determining that the data corresponding to the write command is not of the specified size and/or type.

17. A computer program product as recited in claim 16, wherein the type of the data corresponds to a volume identifier.

18. A computer program product as recited in claim 16, wherein the size specified for the block is different than a size specified for a user data block.

19. A computer program product as recited in claim 16, wherein the block is a first block on the tape.

20. A computer program product as recited in claim 16, wherein the write command is received from a first host, wherein the current location of the magnetic tape is at the block at a beginning of tape because of a rewind command received from a second host.

* * * * *